US012612184B2

(12) United States Patent
Hageman et al.

(10) Patent No.: US 12,612,184 B2
(45) **Date of Patent: \*Apr. 28, 2026**

(54) AUTOMATED FUELING PRESET CONVERSION AND CONTROLS

(71) Applicant: Advanced Flow Solutions, Inc., Oklahoma City, OK (US)

(72) Inventors: Jeff Hageman, Lindenhurst, IL (US); Bryan Haynes, Sugar Land, TX (US); Dan Clevenger, Stokesdale, NC (US); Frank Montalvo, Buffalo Groove, IL (US)

(73) Assignee: Advanced Flow Solutions, Inc., Oklahoma City, OK (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/662,361

(22) Filed: May 13, 2024

(65) Prior Publication Data

US 2024/0300667 A1 Sep. 12, 2024

Related U.S. Application Data

(63) Continuation of application No. 16/983,704, filed on Aug. 3, 2020, now Pat. No. 11,981,454.

(Continued)

(51) Int. Cl.
*B64F 1/28* (2006.01)
*B67D 7/16* (2010.01)
(Continued)

(52) U.S. Cl.
CPC ................. B64F 1/28 (2013.01); B67D 7/16 (2013.01); B67D 7/221 (2013.01); B67D 7/302 (2013.01); B67D 7/3245 (2013.01); B67D 7/58 (2013.01)

(58) Field of Classification Search
CPC .. B64F 1/28; B67D 7/16; B67D 7/221; B67D 7/302; B67D 7/3245; B67D 7/58;
(Continued)

(56) References Cited

U.S. PATENT DOCUMENTS 8,381,779 B1 * 2/2013 Wyler ....................... B64F 1/28
                                                      141/192
8,677,819 B2 * 3/2014 Austerlitz ............ B64D 37/005
                                                      73/304 C (Continued)

FOREIGN PATENT DOCUMENTS

EP        0248121 A2    12/1987
WO    WO-2012075096 A1 *  6/2012   ............ F17C 13/023

(Continued)

OTHER PUBLICATIONS

The International Search Report and The Written Opinion of the International Searching Authority from the related PCT Application No. PCT/US2020/044765, mailed on Feb. 4, 2021, 14 pages.

*Primary Examiner* — Frederick C Nicolas
*Assistant Examiner* — Michael J. Melaragno
(74) *Attorney, Agent, or Firm* — Tucker Ellis LLP; Michael G. Craig

(57) ABSTRACT

An improved fluid transfer accuracy, information collection, and overall management. A system may utilize a pump to transfer fluid from a source to a target vessel, a meter for measuring an amount of fluid transferred, a density meter to detect actual fluid density, and a control unit to determine actual fluid transfer amount based on density. As an example, a fluid flow meter can be coupled with a flow conduit to determine fluid volume, along with the density meter to detect real-time density of transferred fluid. During a fluid transfer event, such as aircraft refueling, LPG fueling, or other refined fuels or valuable liquids, fluid volume can be converted to fluid weight in real-time based on actual (Continued)

density. The real-time fluid weight can be used to determine if a target fluid weight has been reached, and fluid flow can be shut off at the appropriate time.

20 Claims, 2 Drawing Sheets

Related U.S. Application Data

(60) Provisional application No. 62/881,993, filed on Aug. 2, 2019.

(51) Int. Cl.
*B67D 7/22* (2010.01)
*B67D 7/30* (2010.01)
*B67D 7/32* (2010.01)
*B67D 7/58* (2010.01)

(58) Field of Classification Search
CPC .. B67D 7/04; B67D 7/14; B67D 7/303; G01F 15/02; G01F 15/063; G01F 1/86

USPC .......................................................... 222/20
See application file for complete search history.

(56) References Cited

U.S. PATENT DOCUMENTS

| | | | | |
|---|---|---|---|---|
| 11,346,348 | B2 * | 5/2022 | Wallace | B61D 3/16 |
| 2007/0288130 | A1 * | 12/2007 | Lemoult | G05D 1/0083 |
| | | | | 701/14 |
| 2012/0078538 | A1 * | 3/2012 | Fried | G01F 1/588 |
| | | | | 702/46 |
| 2021/0031946 | A1 * | 2/2021 | Hageman | G01F 1/86 |

FOREIGN PATENT DOCUMENTS

| | | | | | |
|---|---|---|---|---|---|
| WO | WO-2017109452 | A1 * | 6/2017 | | B64F 1/28 |
| WO | WO-2021026080 | A2 * | 2/2021 | | B64F 1/28 |

* cited by examiner

AUTOMATED FUELING PRESET CONVERSION AND CONTROLS

CROSS-REFERENCE TO RELATED APPLICATIONS

This application is a continuation application of U.S. patent application Ser. No. 16/983,704, entitled AUTOMATED FUELING PRESET CONVERSION AND CONTROLS, filed Aug. 3, 2020, which claims priority to U.S. Provisional Patent Application Ser. No. 62/881,993, entitled AUTOMATED FUELING PRESET CONVERSION AND CONTROLS, filed Aug. 2, 2019, all of which are incorporated herein by reference.

BACKGROUND

Pumps can be used to transfer liquid from a source to a target delivery location, such as transferring fuel from a storage vessel (e.g., tanker or above ground/underground storage tank) to a target vehicle (e.g., automobile, truck, airplane, etc.). Often, when transferring fluids, such as fuels, from a storage vessel to a receiving vehicle or container, a metering apparatus is used to identify the amount of liquid transferred in order to maintain appropriate records. Typical meters measure the amount (e.g., volume, weight, etc.) of liquid passing through a transfer component (e.g., hose, pipe, etc.), and display the measured amount for an operator to record. It is common in aviation fueling applications for operators of aircraft to consider the weight or mass of fuel contained onboard the aircraft, before considering volume of fuel, due to a need to determine a total variable load on an aircraft (people, cargo, supplies, fuel, etc.), which can dictate whether an aircraft is appropriately loaded prior to takeoff. Often aviation operator's fuel requests are given in the local mass or weight unit of measure (e.g., kg, lbs., etc.) based on calculations of fuel (e.g., energy on board) required to safely fly to their destination. Considerations can include many factors, such as distance to travel, average air temperature, wind or jet stream effects, total takeoff weight, etc. plus additional fuel to provide a surplus fuel should the flight have unplanned events in-flight that may require re-routing, holding patterns, etc.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and/or systems are disclosed for providing improved fluid transfer, including accurate information (e.g., amount, transactional and/or metering information), for example, to improve management of fueling, and to help provide accurate fueling, which can reduce fuel consumption and carbon emissions (e.g., and save money). As an example, a system may utilize fueling metering device connected inline to a fluid transfer system (e.g., pump), which can register fluidic volume or mass information from the meter, for example, as well as collecting information associated with fluid transfer. In one implementation, fuel density can be identified based on type of fuel, environmental conditions, and other factors. The density can be used to calculate volume or weight based on the amount of fuel transferred in real time.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
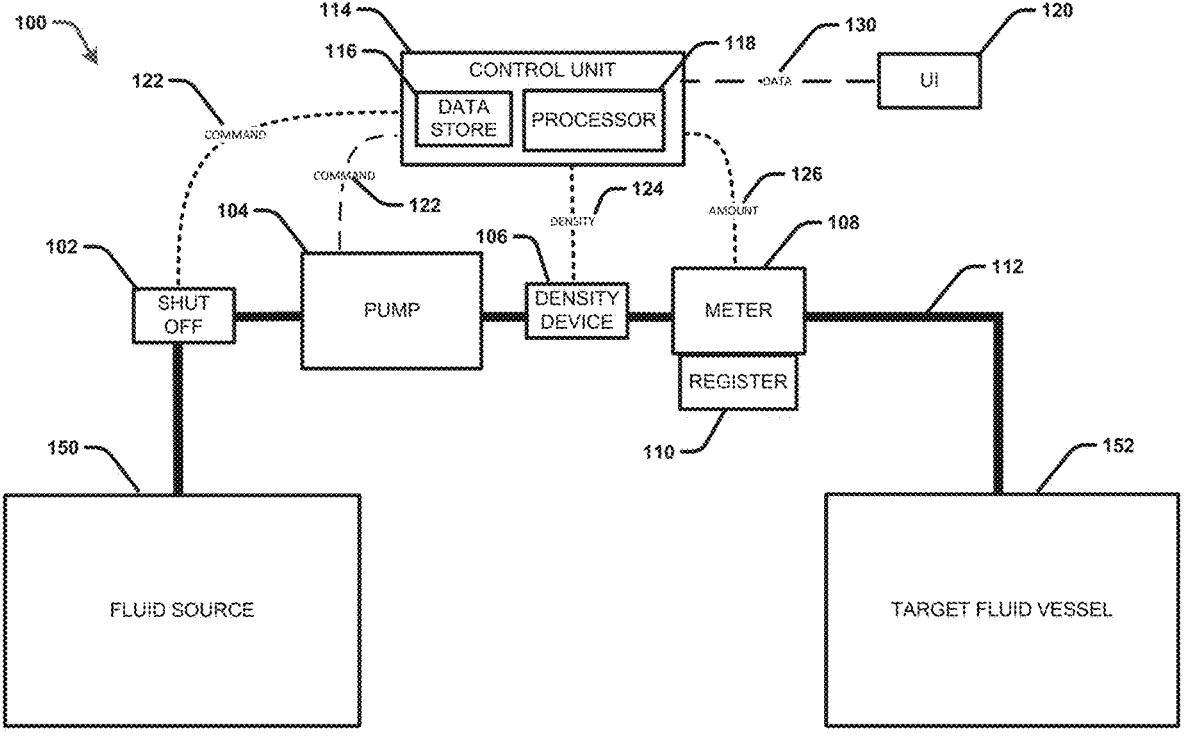
FIG. 1 is a schematic diagram illustrating one implementation of an example system for measuring fluid flow transfer.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As one illustrative example, aircraft fueling involves transferring aviation fuel from a storage tank (e.g., mobile or fixed) to the fuel tank(s) of the target aircraft. Typical fuel transfer operations can involve open nozzle refueling, such as over-the-wing refueling, or pressure refueling, such as using a sealed, pressurized fueling line. Either way, for example, the fuel is pumped from the storage vessel to the aircraft tank(s), and is typically metered to determine how much fuel is transferred. Over-the-wing refueling involves placing a fueling nozzle in a fueling opening (e.g., typically on top of the wing), much like typical automobile fueling, and operating the pump to fill the tank(s) through gravity. Pressure refueling involves securing the fueling line to a fueling opening (e.g., typically under the wing), and sealing it in place. The pump is operated and fuel is forced into the tank(s) under pressure. It should be noted that the techniques and systems, described herein, may be utilized with other fluid transfer operations, in other industries, such as liquefied petroleum gas (LPG) in a variety of industries and settings, ground vehicle fueling, fleet vehicle fueling, and others.

Typically, for aircraft refueling, a fuel meter (e.g., flow meter) is disposed in-line between the storage vessel and the aircraft fuel tank. Often, a pumping vehicle (e.g., dispenser unit or other apparatus) is used to transfer fuel from a stationary tank, from an underground hydrant system, or from fuel stored on-board the vehicle. In one example, the refueling vehicle may comprise a pumping unit and a metering unit, amongst other systems. As an example, an aviation fuel measuring device may comprise a positive displacement meter; and other examples may include amplified turbine, electromagnetic, and mass flowmeters. A positive displacement flow meter measures a flow rate of a volume, or volumetric flow rate, of a fluid moving through known, metered volumes. A number of known volumes that pass through a chamber in the meter identifies the fluid volume; and the rate of revolution of gears or reciprocating parts identifies the flow rate. As one example, a meter may comprise a housing in which a plurality (e.g., three) synchronized rotors turn as a result of fluid flow. In this example, the rate of rotation of the rotors, along with the know volume defined by adjacent rotors, can help identify rate of flow of volume of the metered fluid.

In one aspect, for example, when a typical fuel order is given by an operator (e.g., pilot), it is provided to the airline, fueling company, or human fueler in terms of total fuel mass or weight that the operator desires to be in the airplane for the next flight. In this aspect, the total fuel quantity can be dictated by sophisticated algorithms provided by the airline, accounting for potential variable for the given situation. For example, the pilot is commonly granted authority to override an airline recommended total fuel weight for takeoff, and the pilot can have the authority to request additional (e.g., or less) fuel at their discretion. In this aspect, the additional fuel request is usually limited by the airline to a certain quantity or percentage over the recommended fuel load by the airline.

In this aspect, a typical fuel request, for example, when provided to a fueling company or human fueler, is provided in total mass or weight in a standard unit of weight measure used by the airline. Typically, the fueler (e.g., the contracted fueling services company that fuels the aircraft) receives the fuel request in mass and calculates a conversion of the requested mass or weight to volume. For example, the requested load mass is divided by an average specific gravity of the requested fuel, which can be based on temperature of the fuel, a physical measured density of fuel, or a static average specific gravity from industry provided conversation tables (e.g., API tables, etc.). In this example, the calculation results in an approximate volume, which is the standard by which fueling meters, such as positive displacement flow meters, measure dispense fuel. That is, for example, while the operator request is provided in mass, the fueling meters measure the dispensed fuel in volume due to regulatory and industry requirements.

Alternatively, for example, a human fueler can receive the weight or mass order and calculate the resulting volume by hand, by calculator, or roughly estimated. This conversion can result in potential significant errors due to the calculation, accuracy of conversion, and/or miscommunication, which can impact whether an aircraft receives the desired amount of fuel for the next flight. Sometimes, for example, an unwanted surplus of fuel can be loaded to the aircraft, which adds weight and therefore operational cost to the airlines through increased fuel burn which also results in increased carbon emissions. As an example, in some cases, fuel may need to be removed from the aircraft, causing fight delays.

A system can be devised for automatically and accurately converting fuel mass to volume (and vice versa) based on onsite conditions in real-time, and automatically deliver an accurate amount of fuel, which can help mitigate fueling errors and/or undesired fueling situations. In some implementations, an example system can automatically identify fuel density in real-time (e.g., using a density measuring device), identifying the actual density of the metered fuel at the point of fueling (e.g., at an outlet end of the metering system). In these implementations, for example, the example system can automatically account for fueling conditions (e.g., temperature, atmospheric pressure, other density altering conditions), in real-time by measuring the actual density of the fuel being metered. This real-time measurement can provide improvement over typical metering that involves the use of an average density of the fuel, and separately calculating adjustments based on identified fueling conditions.

Further, in some implementations, an example system can comprise automated fueling measurement and delivery. For example, the example system can automatically convert the metered volume to the amount delivered to the aircraft in mass, to accurately deliver a desired amount of fuel. As an example, some example systems described herein can actively and continuously convert a preset or pre-identified weight to gross volume preset, based on real-time and actual fuel density readings; and return a true fuel weight-to-volume conversion for the entire fuel delivery and transaction. Further, for example, the example system can automatically determine the amount of fuel needed to be delivered in order to meet the total mass of fuel ordered by the aircraft operator. As one example, the fueling system can be automatically shut off (e.g., or an alert to shut-off can be provided) when the appropriate amount of fuel has been delivered.

In one implementation, a system of accurately delivery fuel to a target aircraft (e.g., or other target vessel) can be devised. In this implementation, the example system can comprise a fluid flow meter that is disposed in line of a fuel delivery conduit to measure an amount of flow of fuel passing through the conduit. For example, the fluid flow meter may comprise a positive displacement flow meter, and the conduit can comprise a fueling hose coupled with a storage tank (e.g., above or below ground) or a mobile tanker comprising the desired fuel (e.g., aviation fuel). Further, a fluid pump can be coupled to the conduit to pump the fuel through the hose to a target aircraft (e.g., the aircraft's fuel tank(s)). The fluid flow meter is configured to measure the volume of fuel passing through the conduit (e.g., at the meter), which can be dictated by regulatory and industry standards.

In one implementation, the fluid flow meter may comprise a Weights and Measures-approved (e.g., approved by a governmental or industry agencies for targeted use, accuracy, etc.) mechanical or electronic register, along with ticket printer, and/or control systems, which may be used for truck-mounted or fixed-site meter applications. That is, for example, a site that is without electrical power may utilize a mechanical system that relies on the movement of the fluid through the system to operate the register, and/or control systems. As another example, at a site powered with electricity, an electronic register may be used, along with remote communications to a user interface or computer, ticket printing, and/or control systems.

In one implementation, an electronic register coupled with the flow meter can provide highly accurate metering over various ranges of flow rates. Further, such a register can provide enhanced functions including: automated data collection (e.g., date, time, product selection, delivery quantity, and more), real-time fuel flow amount calculations, meter linearization (e.g., error correction), electronic temperature volume compensation, and/or improved security. In one implementation, an electronic flow meter may comprise a microprocessor-based electronic meter register that is configured to the properties of the metered liquid, and interfaces with the electronic components of the meter system (e.g., and external components such as pumps, injectors, and shutdown devices), and also performs Weights & Measures approved custody transfer actions. Some electronic flow meters can comprise or be communicatively coupled with a user interface used for data output and user input.

In one implementation, an electronic flow meter may comprise a microprocessor-based electronic meter register that is configured to the properties of the metered liquid, and interfaces with the electronic components of the meter system (e.g., and external components such as pumps, injectors, and shutdown devices), and also performs Weights & Measures approved custody transfer actions. Some electronic flow meters can comprise a display screen used for data output and user input.

In one implementation, the flow meter may comprise, or be comprised in, a system for data capture and data management. As an example, such as system may be able to capture transaction data at the fueling point, and send the data to a back end portion (e.g., such as in an office or other third party), to prepare the data for further use, such as volume-mass conversion/calculations, inventory, invoicing, etc. As an example, fueling data can be automatically captured, and the data can be transferred to a back end system for processing. As an example, during fueling operation, a user/operator access information indicative of the fueling operation. Further, in this example, the fueling data may be transferred (e.g., wired or wirelessly) to a data management system, such as in the back end of a fueling management system.

Further, in one implementation, the example system of accurately delivering fuel to a target vehicle can comprise a liquid density measuring device, such as a density meter, hydrometer, aerometer, pycnometer, density kit, and digital density meter. The liquid density measuring device can comprise a body, and least a portion of the body of the density measuring device can be disposed in the fuel transfer conduit in order to determine the density of the fuel that is flowing through the conduit, and the meter, in real-time. That is for example, the density measuring device may have a sensor portion of the body that is disposed in the fluid conduit, and can operably measure the density of the fluid in the conduit in real-time. In this way, for example, changes in density of the fluid, due to differing temperatures, changes in atmospheric pressure, differing fuel compositions, etc., can be accounted for in real-time, while the fluid is moving through the conduit and meter. In one implementation, the density measuring device can be disposed proximate an outlet of the meter, where the density of the fluid that passes through the meter is determined. On other implementations, the body of the density measuring device can be disposed at another location on/in the conduit.

Additionally, the example system for accurately delivering fuel to a target aircraft can comprise a control unit that comprises a processor. In this implementation, the control unit can be configured to receive data that is indicative of the amount of fuel measured by the meter, in volume (e.g., liters, gallons, etc.). For example, the control unit can be communicatively coupled with the fluid flow meter, such as through a wired (e.g., network wired connection) or wireless connection (e.g., wireless network connection, WiFi, RF signal, Bluetooth, near-field, or other appropriate coupling). The control unit can be configured to receive data that is indicative of the density of the fuel identified by the density measuring device in real-time or periodically. For example, the control unit can be communicatively coupled with the density measuring device, such as through a wired or wireless connection.

In this implementation, the control unit can use the processor to convert the measured volume of fuel to a unit of mass of fuel that passes through the meter. For example, the density of a substance is equal to the mass of the substance per unit volume of the substance (Density=Mass/

Volume). Therefore, if the volume of the fuel is known, and the actual density of the fuel is known, the mass of the fuel can be accurately determined, such as by the processor in the control unit.

In one implementation, the control unit can use the processor to determine an amount of fuel to be dispensed in real-time to reach a target total mass of fuel, based at least upon an existing mass of fuel in a target aircraft and the target total mass of fuel. That is, for example, prior to and during fueling, an existing amount of fuel (e.g., greater than or equal to zero, up to a capacity of the fuel tank(s)) is disposed in the fuel tank(s) of the aircraft. Prior to fueling, an operator (e.g., the pilot) may request a specific amount of fuel (e.g., in a mass/weight unit), which is based on the expected next flight (e.g., and expected flight conditions). In this example, the amount of fuel disposed in the aircraft is known and the amount of total fuel desired to be in the aircraft after fueling is known.

The processor can be used to identify the amount of fuel to be transferred to the aircraft in order to reach the total fuel desired. Therefore, for example, the difference between the amount of fuel in the aircraft and the total fuel desired can be determined, such as in mass, and used to determine the amount of fuel needed to be transferred in real-time in volume. In this example, the existing fuel (Ew) in weight can be subtracted from the total desired fuel (Tw) in weight to obtain the amount of fuel to be transferred (Aw) in weight. During fueling, for example, the amount of fuel to be transferred (Av) in volume can be converted to weight in real-time, based at least upon the measured specific gravity of the metered fuel passing through the fueling conduit. In this way, an appropriate amount of fuel in weight (Aw) can be transferred to the target aircraft, to reach the total desired fuel (Tw) in weight.

In one implementation, the example system for accurately delivering fuel to a target aircraft can comprise a shut-off valve that is disposed in line with the conduit. In this implementation, the shut off valve can automatically shut off the flow of fuel through the conduit upon receiving a signal from the control unit that the amount of fuel to be dispensed (e.g., Aw) to reach the target total mass of fuel (e.g., Tw) has been met. In this way, for example, such a system can provide automation to mitigate over or under filling an aircraft with fuel, and other potential fueling errors. As an example, the appropriate information can be input to the control unit, comprising the amount of existing fuel in the tank (e.g., Ew) and the amount of total desired fuel (e.g., Tw), resulting in an automated fueling of the aircraft to the total desired fuel.

In some implementations, the shut off valve can be manually activate to shut off the flow of fuel through the conduit. In this implementation, an operator may receive the signal from the control unit that the amount of fuel to be dispensed (e.g., Aw) to reach the target total mass of fuel (e.g., Tw) has been met. As an example, the operator may receive a signal on the user interface, through an alarm, or some other alert to manually operate the shut off. Further, in some implementations, the shut-off valve may be operated automatically or manually in the event of a fueling error, to pause the fueling, or to mitigate a situation where continued fueling is not desired (e.g., emergency). In these implementations, an automated signal may be received, and/or an alert may be provided to the operator.

In one implementation, the example system may comprise a sensor and/or sensor reader that automatically detects, or receives information regarding, the amount of existing fuel in the aircraft. In this example implementation, merely the amount of total desired fuel may be input to the control unit, resulting in the automatic fueling of the aircraft to the total desired fuel level.

In one implementation, the control unit can be used to adjust the amount of fuel that is to be dispensed to the target aircraft in real-time to reach the target total mass of fuel. In this implementation, the adjustment can at least be based on the fuel density data received, which is indicative of the real-time density of the fuel, from the density measuring device. In this way, for example, a real-time and accurate volume to weight conversion can be performed by the control unit, which will allow for accurate fueling to the target total mass of fuel. In one implementation, an initial specific gravity of the fuel to be transferred can be input to the control unit, such as by a communicatively coupled user interface (e.g., locally or remotely). For example, a known specific gravity value (e.g., average value) can be used as the input value. During fueling, in this example, the control unit can adjust the specific gravity value based on the data indicative of the actual specific gravity received from the density measuring device.

In one implementation, the control unit can be wired or wirelessly, communicatively coupled with the data input component. The data input component can comprise a user interface that transmits user input data, which is received by the control unit. Further, control unit can transmit data to the communicatively coupled data input component, for example, in order to display information about the fueling operation over the user interface, such as to an operator. As an example, the displayed information can comprise a total mass of fuel delivered to the target aircraft, in-process fueling information, fuel volume, and other relevant and desired information.

In one implementation, the control unit can receive or generate a fueling pause command, which results in the shut-off valve shutting off flow in the conduit, at least until an updated target total mass input, and/or a resume command is received by the control unit. That is, for example, if the target total mass information is incorrect or does not meet pre-loaded parameters, the control unit may pause fueling at least until an updated reading or input is received for the target total mass of fuel. Further, for example, an operator may enter a pause command using a coupled user input to temporarily pause the fueling operation in order to enter an updated target total mass of fuel. In this example, once the updated information is input a resume command can be input, and/or the control unit can automatically recognize the updated information and resume fueling.

In one implementation, the control unit can be coupled with memory or data storage to store data of historical fueling delivery operation. That is, for example, the control unit can comprise or be coupled with memory locally (e.g., at the meter), and/or the control unit may be coupled with memory or storage remotely (e.g., at a user input device or remote storage). The historical fueling data can comprise amounts, fuel type, time/day, aircraft identification, operator identification, environmental conditions, specific gravity, and other conditions associated with the fueling, including system operation information for maintenance. In one implementation, the control unit can transmit data indicative of an error message to an alert component that provides an alert to an operator of the fueling system. The error message can be indicative of a potential error in fueling delivery calculation. For example, an alert component can be comprised in the user interface, a separate alarm disposed on the meter or fueling system, or remote communications computer.

FIG. 1 is a component diagram illustrating an example implementation of a system 100 for accurately dispensing fluid. The example system 100 comprises a fluid flow meter 108, which can be disposed in-line of the conduit 112 that is transferring fluid from a fluid source 150 to a target fluid vessel 152. A density measuring device 106 can be disposed, at least partially, in-line with the conduit 112, such that the density of the fluid can be determined in real-time. The density measuring device 106 can be disposed upstream or downstream from the meter 108. In some implementations, a pump 104 can be used to pump the fluid through the conduit 112. A control unit 114 comprises a processor 118, to convert the measured volume 126 of fluid identified by the meter 108, and determine an amount of fuel dispensed in real-time, based on density 124 determined by the density measuring device.

The example system 100 can comprise a shut-off 102, that may be used to shut off flow of fluid through the conduit 112, when receiving a command 122 to do so. The shut-off 102 can be disposed anywhere appropriate along the conduit 112 in order to perform the shut off function. In some implementations, the shut-off 102 can comprise a valve, with an actuator, that automatically shuts when the command 102 to do so is received. In some implementations, the shut off 102 can be part of, or disposed in, the pump 104, and a command 122 can be sent to the pump to shut off the pump.

In some implementations, the control unit 114 can utilize the processor to adjusting the amount of fuel to be dispensed in real-time to reach a target total mass of fuel, based at least upon the data indicative of the real-time density 124 of the fuel from the density measuring device 106. Further, the control unit 114 can comprise (e.g., or be coupled to) data storage 116 (e.g., memory). In this example, the target amount of fuel stored in memory can be adjusted based on updated (E.g., changed) density 124 received from the density measuring device 106.

The control unite 114 can be wired or wirelessly coupled to a user input component that comprises a user interface 120. The user interface can receive or send data 130, such as commands, fueling data, updates, alerts, alarms, error messages, etc. A register 110 may be coupled with the meter 108. The register can be mechanical or electrical, and can record metering data. In some implementations, the electrical register can transmit data to the control unit, which may store the data in storage 116, and/or send data 130 to the user interface 120.

Figure 2:
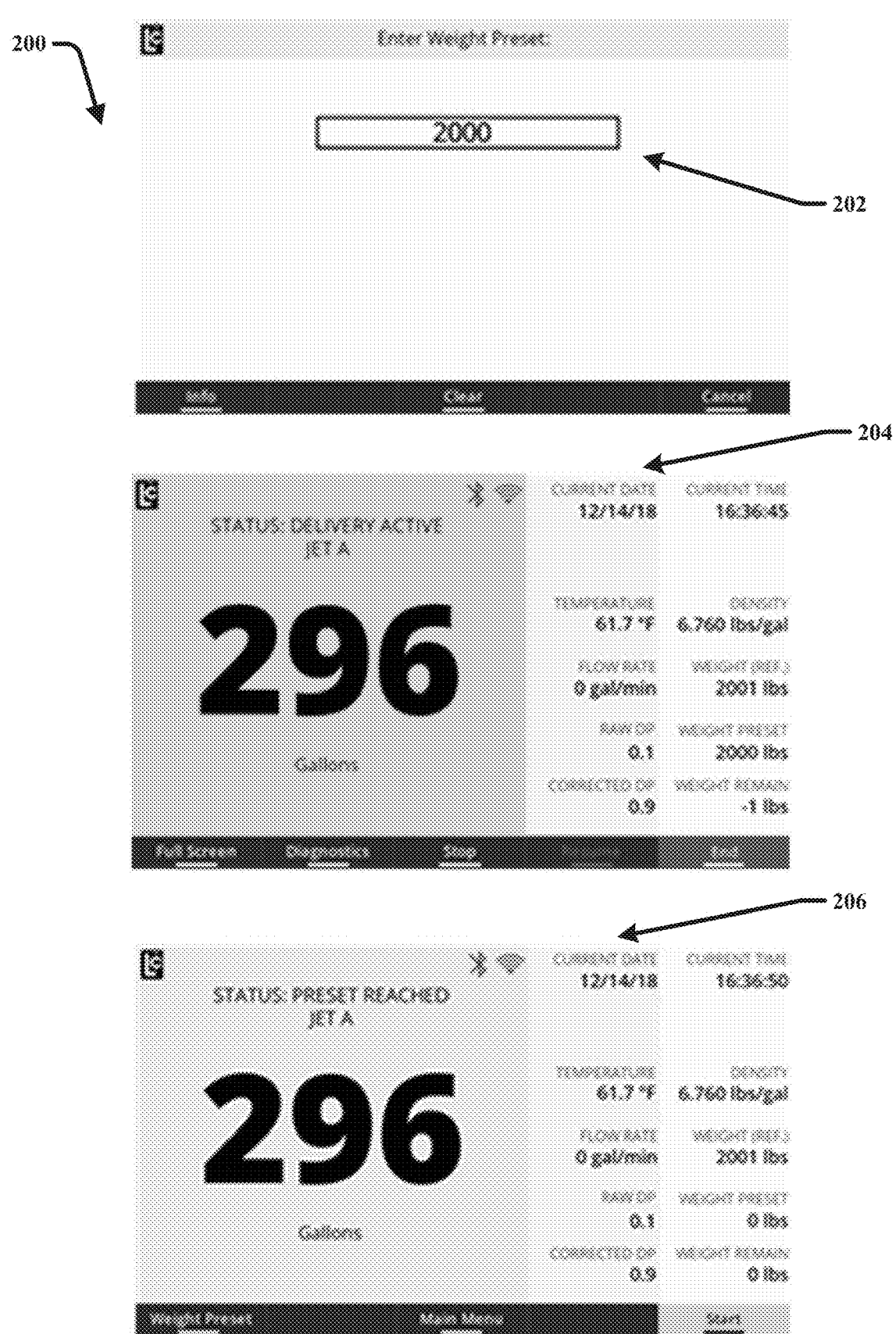
FIG. 2 is a component diagram illustrating one implementation of an example user interface that can be used to implement one or more portions of one or more methods and systems described herein.

As an illustrative example, FIG. 2 illustrates one example of a display 200, such as comprised in a user interface, which can be used to implement one or more portions of one or more methods and systems described herein. In this example, the display 200 illustrates three separate informational screens 202, 204, 206, respectively displaying information associated with the fuel delivery process. The screen at 202 displays a user input screen that shows the desired target total fuel for the target aircraft. That is, for example, a user may enter a total weight of fuel desired to be present in the aircraft after fueling is completed, in this case, two-thousand pounds (2,000 lbs.). This target total weight can be provide by the aircraft operator, and entered by the fueling operator, for example.

The screen at 204 displays a status screen that provides appropriate and desired fueling status information during the fueling operation. For example, the system described herein has converted the weight of fuel (e.g., based on target total Tw and existing amount Ew) to an amount of fuel that needs to be delivered to the aircraft, in volume (e.g., here, 296 gallons), to meet the target total (e.g., 2,000 lbs.). Further, the current date and time, temperature, fuel flow rate, density of the fuel in real-time (e.g., based on the measured specific gravity of the fuel), and other relevant information. The screen at 206 displays a status screen that provides appropriate and desired fueling information at the completion of the fueling operation. For example, the total amount of fuel delivered in volume (296 gallons), the total weight of fuel in the aircraft (2,001 lbs.), and other relevant information.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for accurately delivering fuel to a target fluid vessel, comprising:
   a fluid flow meter disposed in line of a fuel delivery conduit to measure an amount of a flow of fuel passing through the conduit;
   a density measuring device comprising a body at least a portion of which is disposed in the conduit to operably determine a real-time density of the fuel that passes through the fluid flow meter; and
   a control unit comprising a processor, the control unit receiving data indicative of a volume of fuel measured by the fluid flow meter, and receiving data indicative of the real-time density of the fuel from the density measuring device, the control unit using the processor to:
   convert the measured volume of fuel to a unit of mass of fuel that passes through the fluid flow meter; and
   determine an amount of fuel to be dispensed in real-time to reach a predetermined target total mass of fuel disposed in the target fluid vessel, based at least upon an existing mass of fuel in the target fluid vessel and the target total mass of fuel.

2. The system of claim 1, comprising a shut-off that operably, automatically shuts off the flow of fuel through the conduit upon receiving a signal from the control unit that the amount of fuel to be dispensed to reach the target total mass of fuel has been met.

3. The system of claim 2, the shut-off comprising a valve disposed in line with the conduit to operably shut off the flow of the fluid through the conduit.

4. The system of claim 1, comprising a fluid pump coupled to the conduit to operably pump the fuel through the conduit to the target fuel vessel.

5. The system of claim 4, comprising a shut-off that automatically shuts off operation of the pump to automatically shut off the flow of fuel through the conduit.

6. The system of claim 1, the control unit automatically adjusting the amount of fuel to be dispensed in real-time to reach a target total mass of fuel based at least upon the data indicative of an adjustment to the real-time density of the fuel from the density measuring device.

7. The system of claim 1, the target total mass of fuel input to the control unit prior starting the flow of fuel through the meter.

8. The system of claim 1, an initial specific gravity of the fuel input to the control unit prior to starting the flow of fuel through the meter.

9. The system of claim 1, the control unit wired or wirelessly, communicatively coupled with a data input component comprising a user interface, to receive user input data.

10. The system of claim 9, the control unit transmitting with the communicatively coupled data input component to display information about the fueling operation over the user interface.

11. The system of claim 10, the displayed information comprising a total mass of fuel delivered to the target fuel vessel.

12. The system of claim 1, the control unit receiving a fueling pause command resulting in a shut-off valve operating to shut off flow in the conduit, at least until an updated target total mass input is received by the control unit.

13. The system of claim 1, the control unit coupled with or comprising memory or data storage to store data indicative of historical fuel delivery information.

14. The system of claim 1, the control unit transmitting data indicative of an error message to an alert component that provides an alert to an operator of the fueling system, the error message indicative of a potential error in fueling delivery calculation.

15. The system of claim 1, the fluid flow meter comprising a mechanical or electronic register to operably identify the volume of fluid in real-time.

16. A method of accurately delivering fuel to a target fluid vessel using a fluid delivery system that has a fluid flow meter to measure an amount of a flow of fuel passing through a fuel delivery conduit of the systems, comprising:

providing a density measuring device comprising a body at least a portion of which is disposed in the conduit to operably determine a real-time density of the fuel that passes through the fluid flow meter; and providing a control unit comprising a processor, wherein the control unit receives data indicative of a volume of fuel measured by the fluid flow meter, and receives data indicative of the real-time density of the fuel from the density measuring device, and wherein the control unit uses the processor to automatically:

convert the measured volume of fuel to a unit of mass of fuel that passes through the fluid flow meter; and determine an amount of fuel to be dispensed to a target vessel in real-time to reach a target total mass of fuel, based at least upon an existing mass of fuel in the target vessel and the target total mass of fuel.

17. The method of claim 16, comprising providing a shut-off that operably automatically shuts off the flow of fuel through the conduit upon receiving a signal from the control unit that the amount of fuel to be dispensed to reach the target total mass of fuel has been met.

18. The method of claim 16, the control unit automatically adjusting the amount of fuel to be dispensed in real-time to reach a target total mass of fuel based at least upon the data indicative of an adjustment to the real-time density of the fuel from the density measuring device.

19. The method of claim 16, comprising providing a user input device comprising a user interface to input data and receive information.

20. A device for accurately delivering fuel to a target fluid vessel, comprising:

a control unit comprising a processor, the control unit operably coupled with a flow meter and receiving data from the flow meter indicative of fluid flow volume determined by the flow meter, and operably coupled with a density measuring device and receiving data from the density measuring device indicative of real-time density of the fluid that passes through the fluid flow meter, the control unit using the processor to:

convert the measured volume of fuel to a unit of mass of fuel that passes through the fluid flow meter;

determine an amount of fuel to be dispensed to a target vessel in real-time to reach a target total mass of fuel, based at least upon an existing mass of fuel in the target vessel and the target total mass of fuel; and transmit a command to a shut off device coupled with a fueling conduit to automatically shut off fluid flow once the target total mass of fuel has been indicted; and a user input device comprising a user interface, the user input device operably sending data to the control unit, and receiving data indicative of status of a fueling operation.

\* \* \* \* \*